Sept. 6, 1949.  T. K. REMKE ET AL  2,480,965
CLOSURE FOR VEHICLE BODIES
Filed May 1, 1948  2 Sheets-Sheet 1
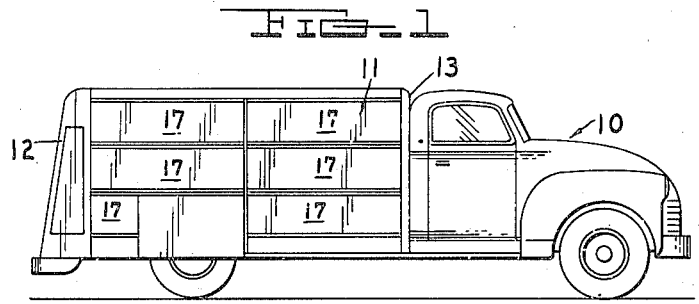
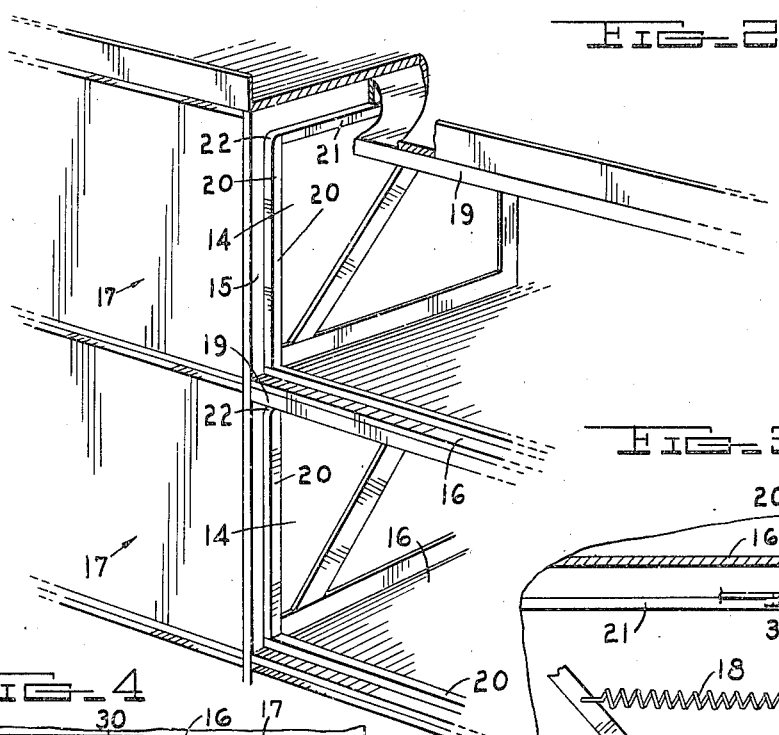
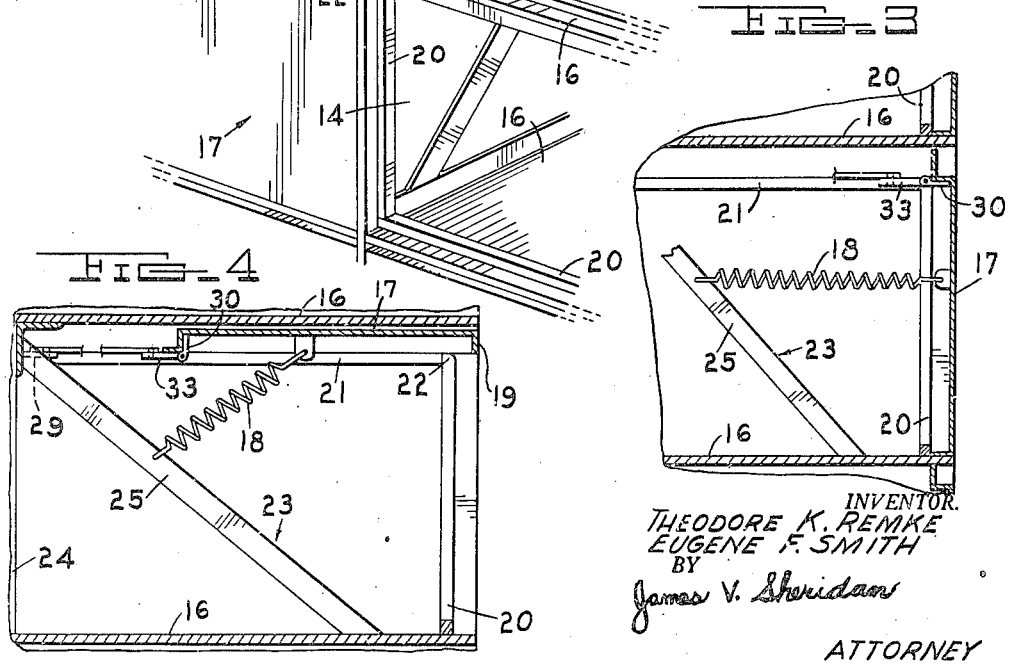
INVENTOR.
THEODORE K. REMKE
EUGENE F. SMITH
BY James V. Sheridan
ATTORNEY

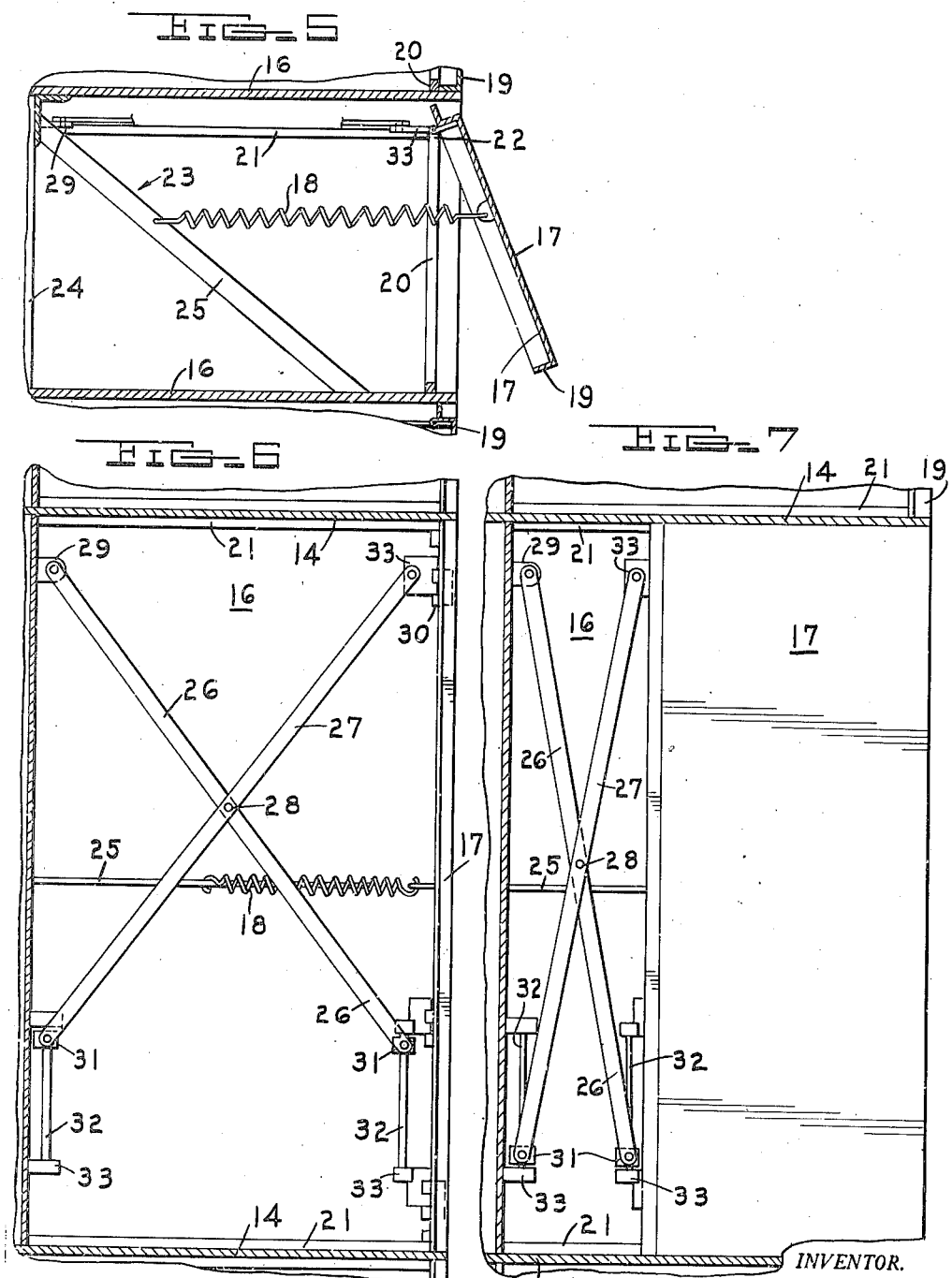

Patented Sept. 6, 1949

2,480,965

UNITED STATES PATENT OFFICE 2,480,965

CLOSURE FOR VEHICLE BODIES

Theodore K. Remke and Eugene F. Smith,
Detroit, Mich.

Application May 1, 1948, Serial No. 24,644

7 Claims. (Cl. 296—24)

This invention relates to a vehicle body and more particularly to a swingable and slidable closure which is particularly adapted for use on truck bodies having a plurality of compartments, such as those conventionally employed for carrying bottled beverages.

The truck bodies employed for the transportation and delivery of bottled beverages are at present provided with a plurality of shelves, each having a height sufficient to conveniently accommodate cases of beverage. The sides of the conventional bodies are left open and the contents are thus subjected to cold and other adverse weather conditions which frequently cause considerable damage to the beverage. Moreover, with the present bodies the cargo cannot be protected adequately from theft, and other unauthorized tampering.

Doors described in the art have not proved suitable for the present purpose for a number of reasons. Primarily, they lack the convenience in operation necessary to allow rapid opening and closing thereof, especially when the operator has only one free hand to operate the door. Further, such doors would obstruct and otherwise impair the accessibility to the cargo in adjacent compartments. In addition, such doors must also be held in either the opened or closed positions and must likewise release automatically when moved to the opposite position. Furthermore, with the conventional body, very little surface area is allowed for advertising matter and similar indicia, despite the fact that such space is extremely valuable on this type of vehicle body.

It is therefore an object of the present invention to provide a door mechanism which is adapted to efficient and convenient use on vehicle bodies, and adapted particularly for use on bodies provided with a plurality of compartments.

Another object is to provide a door having a means for yieldably holding the same in either the open or closed positions.

Still another object is to provide a door for closing a compartment on a vehicle body of the above type, which is adapted to move into the vehicle body so that accessibility to any adjacent compartment is not impaired.

Another object is to provide a plurality of door panels for a compartmented vehicle body which collectively provide a substantial surface area for advertising matter or other indicia.

A feature of the present invention is to provide a closure for a vehicle body comprising a door supported on the body and movable relative to the body between closed and open positions, means for guiding the movement of the door between said positions, and resilient means yieldably connecting said door to a portion of the body, the door being stable in only the closed and opened positions.

Another feature is to provide a closure of the above type wherein the door has an intermediate position, between the closed and opened positions, in which the force exerted by the resilient means is a maximum, the force exerted by the resilient means continuously decreasing as the door moves from the intermediate position toward either the closed or opened positions.

Still another feature of the invention is to provide a closure in which the door is swingably and slidably supported on the vehicle body.

Another feature is to provide a closure having a single spring yieldably connecting the door to a portion of the body whereby the door is stable only in the closed and opened positions thereof.

Still another feature is to provide an equalizing mechanism for the door.

Figure 1 is a view of a vehicle with a body having closures embodying the features of the present invention;

Figure 2 is a perspective view of the body having portions broken away for clarity;

Figure 3 is an end elevation showing a door in the closed position and embodying the features of the present invention;

Figure 4 is another end elevation showing the door in open position;

Figure 5 is a similar view showing the door in an intermediate position;

Figure 6 is a plan view of the door shown in Figure 3; and

Figure 7 is a similar view of the door shown in Figure 4.

Referring more particularly to the drawings:

In Figure 1 is shown a vehicle 10 having a body 11, including end walls 12 and 13 and two side walls (one not shown) extending between the end walls. A plurality of compartments 14 are provided in the body 11, said compartments being formed by the bulkhead or brace 15, positioned intermediate the end walls, and a plurality of vertically spaced shelves 16 having their end portions secured to the end walls 12 and 13.

Each compartment 14 is provided with a closure having a door 17 supported on the body 11 and movable relative to the body between a closed position and an opened position; means for guiding the movement of the door between the positions; and a resilient means 18 for yieldably connecting the door 17 to the body 11 whereby the door is stable in only the closed and opened positions.

The door 17 may be of any suitable material, such as metal or wood, and is preferably provided with a plain exterior surface adapted to lie, in its closed position, in a common plane with the side of the vehicle body. In opened position, the door is disposed substantially horizontally and extends into the compartment 14, having the lower edge 19 thereof substantially flush with the side of the body 11.

The means for guiding the door between the closed positions may be of various types but, as illustrated herein, including the jambs 20 and the guide members 21. The jambs 20 serve as a stop for the door in the closed position of the latter, and the upper edge 22 of the jamb provides a fulcrum for the door about which the latter is adapted to pivot. The guide members 21 are adapted to slidably engage the door when the latter is moved in a horizontal or closing attitude and to support the same in its closed position.

Each of the compartments 14 is provided with a jamb 20 which extends horizontally along the lower edges thereof and upwardly along the vertical edges of the compartments, terminating (at 22) somewhat below the top of the opening. The jambs 20 are inset a distance equivalent to the thickness of the doors to provide a substantially unbroken surface for the vehicle body when the doors 17 of all the compartments are closed. Thus, a substantial surface area is provided on the body for advertising matter or other indicia.

Secured to the terminal ends of the jambs 20 are the guide members 21 which extend into the compartment, transversely of the body 11. One of the guide members 21 in each compartment is secured to an end wall by any suitable means and the other guide member is secured to the bulkhead 15. Also provided in each compartment, intermediate the ends thereof, is a bracket 23 having a vertical portion 24 extending between and secured to the adjacent shelves 16, and an angularly disposed portion 25 having one end rigidly engaged to the top of the vertical portion and the other end secured to the lower shelf 16 adjacent the open end of the compartment.

The resilient means, such as spring 18, is provided for holding the door 17 in either the closed or open positions and has one end secured to a portion of the door, spaced from the pivotal axis thereof, and has the other end fastened to the angularly disposed portion 25 of the bracket 23. The spring 18 is under tension at all times and thus urges the door towards the closed position when the latter is in any attitude except the horizontal attitude. In the case where the door is in the horizontal attitude the door is urged towards open position. Since the tension of the spring is greater at an intermediate position of the door and continuously decreases as the door moves toward either the opened or closed position, the door is stable only in either the closed or opened position thereof.

An equalizer mechanism is also provided for the door 17 which is formed of two crossed arms 26 and 27, pivotally connected at their point of intersection, as indicated at 28. The inner end of the arm 26 is pivoted to a supporting member 29, secured to the under side of the upper shelf of the compartment 14, and the outer end of the arm 27 is pivoted on a bracket 33 which is secured to a hinge 30 which, in turn, is secured to the door 17. The outer end of the arm 26 and the inner end of the arm 27 are each pivotally connected to sleeves 31, and the latter are slidably mounted on rods 32, carried by the upper shelf 16 and the door 17 respectively. Brackets 33 are employed to secure and space the rods from their respective mountings, the brackets supporting the outer ends of the arms 26 and 27 being secured to the door hinges and, in fact, may be considered as being an extended portion of one leaf of said hinges.

In operation, when it is desired to open one of the doors, the operator swings the door 17 outwardly and upwardly into a horizontal or closing attitude. The door then moves inwardly along the guide members 21 under the top shelf, in response to a force exerted by the spring 18, until the lower edge 19 of the door is flush with the side of the vehicle body 11. As the door 17 moves inwardly or outwardly in the horizontal position the sleeves 31 slide upon the rods 32, thereby accurately maintaining the position of the door such that its ends are parallel with the ends of the body 11. This prevents any lateral play of the door.

While a specific embodiment of the invention has been shown and described, it will be apparent that the structure may be modified considerably without departing from the present invention. For example, it may be desirable to provide closure on both sides of the body or in the end walls thereof, or the doors may be mounted for merely sliding movement over an arcuate or other suitable path between the closed and opened positions. The spring might also be replaced by any suitable resilient means. It is necessary only that the door be movable between terminal positions and be stable only in said positions because of the nature of the path of movement of the door and the force exerted by the resilient means.

We claim:

1. A closure for a vehicle body comprising a door having a closed position, a substantially normal horizontal open position which is disposed within the body, and a pivotal axis located substantially coincident with the top edge of said door in its closed position; an equalizer means pivotally connecting said door to the body and adapted to equalize movement of said door when the latter moves in a horizontal position; means for guiding the movement of said door between said opened and closed positions including a vertical jamb portion having the upper end thereof providing a fulcrum for the pivotal movement of said door and a guide member for slidably engaging the door in the horizontal position thereof and supporting the same in its open position; and a spring yieldably connecting said door to a portion of the body, said spring having one end connected to the door at a point spaced from said pivotal axis, wherein said point is fixed relative to said door, wherein said point is below the pivotal axis when the door is in its closed position, said point traversing the path of a portion of the door upon both pivotal and sliding movement of said door, wherein said spring extends rearwardly from said door in a line which lies substantially below said horizontal open position when said door is closed and extends rearwardly and downwardly from said door at an angle to said horizontal open position when said door is open, and wherein said spring is under tension at all points on said path.

2. A closure for a vehicle body comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and resilient means yieldably connecting said door to a portion of the body, wherein said resilient means is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, and wherein said resilient means extends rearwardly from said door in a line which lies substantially below said horizontal open position when said door is closed and extends rearwardly and downwardly from said door at an angle to said horizontal open position when said door is open, and wherein said resilient means is under tension at all points on said path.

3. A closure for a vehicle body comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and resilient means yieldably connecting said door to a portion of the body, wherein said resilient means is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, wherein said resilient means extends rearwardly from said door in a line which lies substantially below said horizontal open position when said door is closed and extends rearwardly and downwardly from said door at an angle to said horizontal open position when said door is open, wherein said spring is under tension at all points on said path, and wherein there is an intermediate position in said path between the closed and open positions of said door in which the force exerted by said resilient means is a maximum, said force continuously decreasing as said door moves from said intermediate portion toward either the closed or open position.

4. A closure for a vehicle body comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and resilient means yieldably connecting said door to a portion of the body, wherein said resilient means is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, wherein said resilient means extends rearwardly from said door in a line which lies substantially below said horizontal open position when said door is closed and extends rearwardly and downwardly from said door at an angle to said horizontal open position when said door is open, wherein said spring is under tension at all points on said path, and wherein said resilient means urges the door in a direction toward either its open or closed position determined by the position of said door.

5. A closure for a vehicle body comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and single resilient means yieldably connecting said door to a portion of the body, wherein said resilient means is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, and wherein said single resilient means extends rearwardly from said door in a line which lies substantially below said horizontal open position when said door is closed and extends rearwardly and downwardly from said door at an angle to said horizontal open position when said door is open, and wherein said resilient means is under tension at all points on said path.

6. A closure for a vehicle body comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and a spring yieldably connecting said door to a portion of the body, wherein said spring is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, and wherein said spring extends rearwardly from said door in a line which lies substantially below said horizontal open position when said door is closed and extends rearwardly and downwardly from said door at an angle to said horizontal open position when said door is open, and wherein said spring is under tension at all points on said path.

7. A vehicle body having a plurality of compartments and having a closure for each compartment, said closure comprising a door supported on the body for a pivotal movement and a sliding movement relative thereto and having a closed position, a substantially normal horizontal open position which is disposed within the body, and a pivotal axis for said pivotal movement located substantially coincident with the top edge of the door in its closed position and adapted to permit the door to swing outwardly and upwardly from said closed position into a horizontal position; means for guiding the door in a sliding movement in said horizontal position to said open position; and resilient means yieldably connecting said door to a portion of the body, wherein said resilient means is connected to said door at a point spaced from said pivotal axis, wherein said point is fixed relative to said door, wherein said point is below the pivotal axis when the door is in its closed position, said point traversing the path of a portion of the door upon both pivotal and sliding movement of said door, wherein said resilient means extends rearwardly from said door in a line which lies substantially below said horizontal open position when said door is closed and extends rearwardly and downwardly from said door at an angle to said horizontal open position when said door is open, and wherein said spring is under tension at all points on said path.

THEODORE K. REMKE.
EUGENE F. SMITH.

REFERENCES CITED

The following references are of record in the file of this patent:

UNITED STATES PATENTS

| Number | Name | Date |
|---|---|---|
| 715,243 | Casler | Dec. 9, 1902 |
| 726,957 | Macey | May 5, 1903 |
| 892,747 | Lawson | July 7, 1908 |
| 1,124,570 | Woltz | Jan. 12, 1915 |
| 1,530,428 | Sines | Mar. 17, 1925 |
| 2,455,417 | Holan et al. | Dec. 7, 1948 |